(12) United States Patent
Nakashima

(10) Patent No.: US 6,609,166 B1
(45) Date of Patent: Aug. 19, 2003

(54) IRDA COMMUNICATION IC, ELECTRONIC APPARATUS AND EXTERNALLY-FITTED COMMUNICATION APPARATUS HAVING SUCH AN IRDA COMMUNICATION IC, AND METHOD OF ADDING AN IRDA COMMUNICATION FUNCTION

(75) Inventor: Takayuki Nakashima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/461,095

(22) Filed: Dec. 14, 1999

(30) Foreign Application Priority Data

Dec. 25, 1998 (JP) .......................................... 10-368818
Dec. 25, 1998 (JP) .......................................... 10-369028

(51) Int. Cl.$^7$ ............................................... G06F 13/00
(52) U.S. Cl. ............................... 710/71; 710/2; 710/20; 710/33; 710/65
(58) Field of Search .......................... 710/2, 20, 33, 710/65, 71

(56) References Cited

U.S. PATENT DOCUMENTS

| | | | |
|---|---|---|---|
| 5,786,921 A | * | 7/1998 | Wang et al. ................. 359/152 |
| 5,898,513 A | * | 4/1999 | Gist et al. .................... 359/189 |
| 5,961,600 A | * | 10/1999 | Ono et al. ................... 709/228 |
| 6,335,658 B1 | * | 1/2002 | Shiratori ..................... 329/311 |

* cited by examiner

Primary Examiner—Jeffrey Gaffin
Assistant Examiner—Mohammad O. Farooq
(74) Attorney, Agent, or Firm—Arent Fox Kintner Plotkin & Kahn, PLLC

(57) ABSTRACT

Data fed in through a PIO or UART is first converted into IrDA-protocol-conforming data by a CPU executing a software program stored in a ROM, and the resulting data is then fed by way of a bus to a modulation circuit so as to be modulated. A signal fed in to a demodulation circuit is first demodulated to restore IrDA-protocol-conforming data, and the demodulated data is then converted back into its original data by the CPU executing the software program stored in the ROM. The restored data is fed by way of the bus to the PIO or UART.

17 Claims, 8 Drawing Sheets

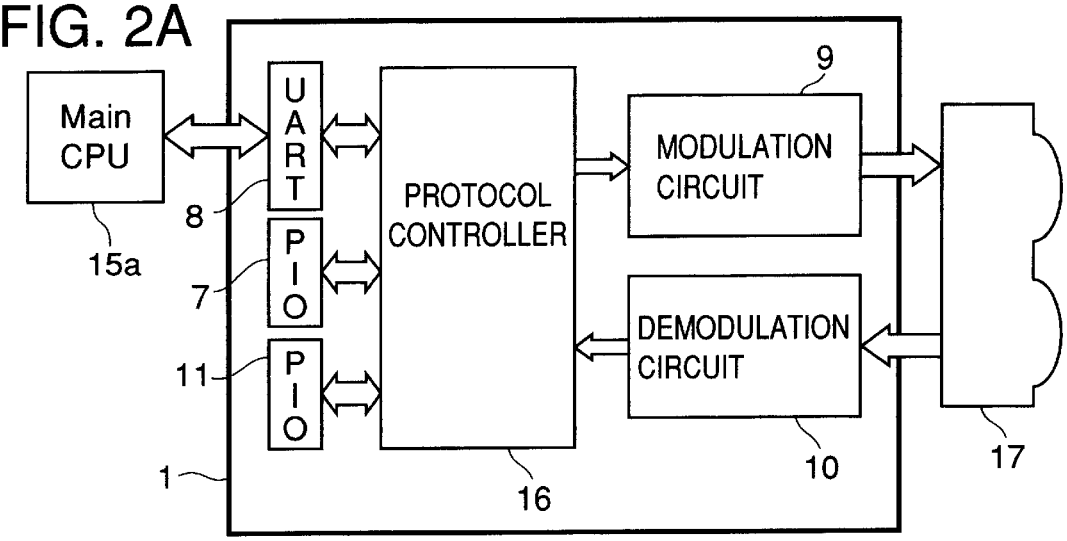
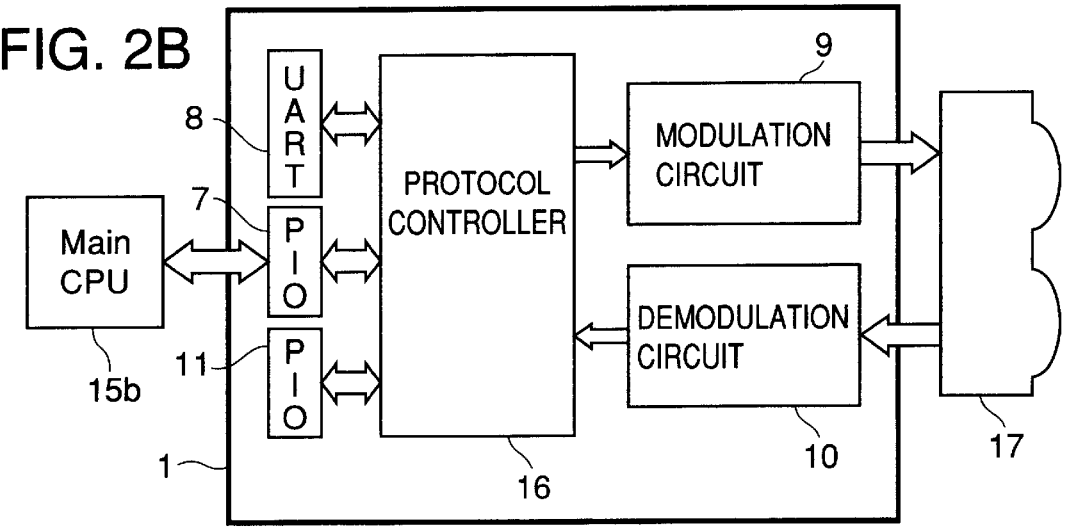

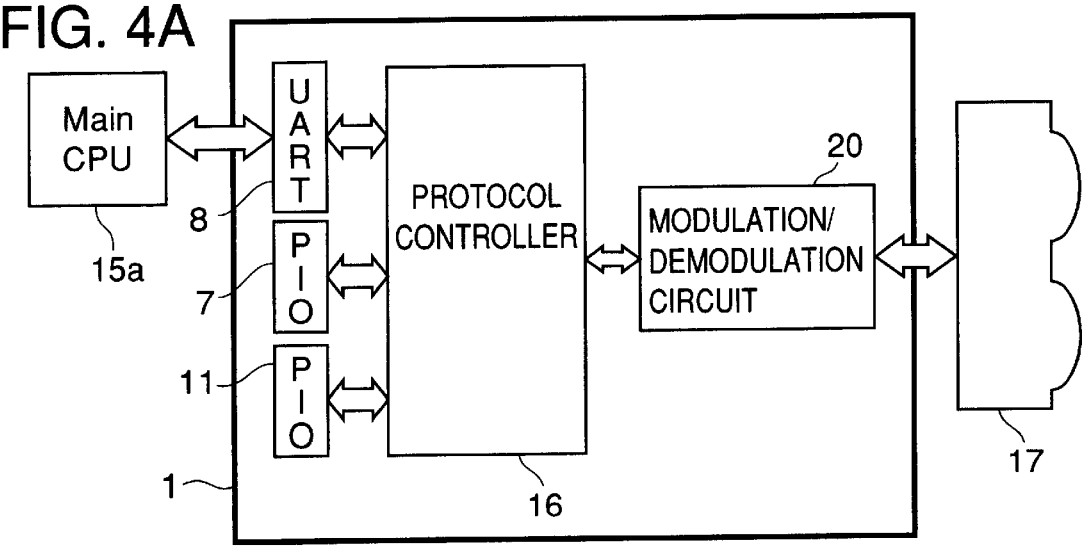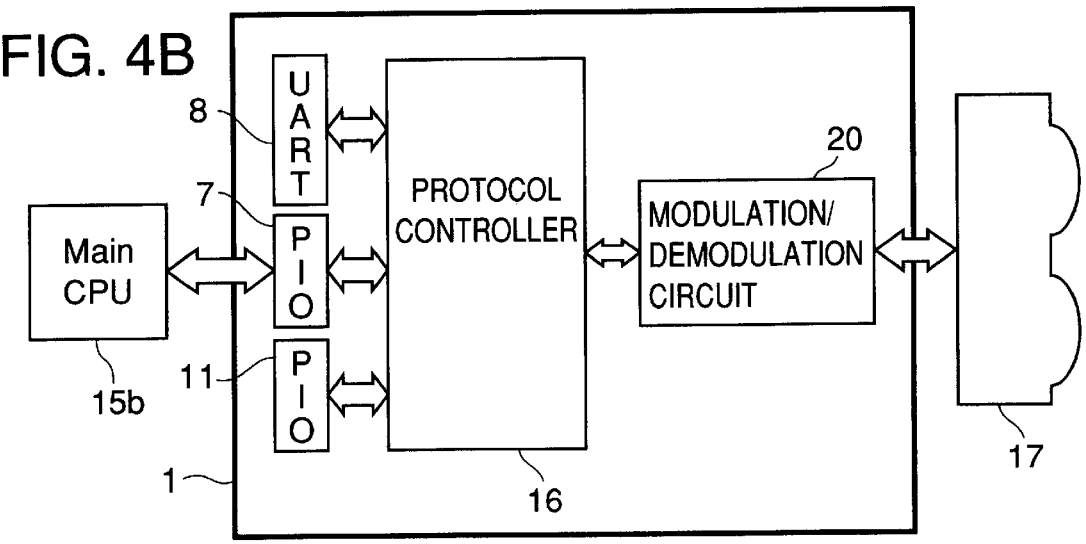

IRDA COMMUNICATION IC, ELECTRONIC APPARATUS AND EXTERNALLY-FITTED COMMUNICATION APPARATUS HAVING SUCH AN IRDA COMMUNICATION IC, AND METHOD OF ADDING AN IRDA COMMUNICATION FUNCTION

BACKGROUND OF THE INVENTION

1. Field of the Invention

The present invention relates to an IrDA communication IC for adding a communication function complying with the IrDA (Infrared Data Association) standards to an electronic apparatus, such as a DSC (digital still camera), personal computer, portable data terminal (also called a PDA (personal digital assistant)), or printer, that is provided with a data transfer port. The present invention relates also to an electronic apparatus having such an IrDA communication IC, and also to an externally-fitted communication apparatus having such an IrDA communication IC and designed to be fitted externally to such an electronic apparatus.

2. Description of the Prior Art

In recent years, infrared communication complying with the IrDA standards has come to be used widely as a means for communication between a terminal apparatus such as a personal computer and an apparatus externally connected thereto, achieving wireless communication between the terminal apparatus and the external apparatus. For example, Japanese Laid-Open Patent Application No. H9-326800 proposes a device for achieving such infrared communication complying with the IrDA standards and a method for controlling such a device.

A block diagram of the internal configuration of the infrared communication device proposed in Japanese Laid-Open Patent Application No. H9-326800 mentioned above is shown in FIG. 9. The infrared communication device shown in FIG. 9 has a CPU (central processing unit) 101 for controlling the entire device, a ROM (read-only memory) 102 for storing a program executed by the CPU 101, a RAM (random-access memory) 103 for storing data used by the CPU 101, an external storage device 104 for storing a file and others used by the CPU 101, an operation section 105 through which the device is operated, a display section 106, a UART 107 for exchanging parallel data with a bus 112, a modulation section 108 for modulating a signal output from the UART 107, a demodulation section 109 for demodulating a signal received through an infrared receiver section 111 and then feeding the demodulated signal to the UART 107, an infrared transmitter section 110 for transmitting infrared rays in accordance with a signal output from the modulation section 108, an infrared receiver section 111 mentioned above, and a bus 112 mentioned above for connecting the constituent blocks 101 to 107 together.

To add an IrDA communication function to an already-existing terminal apparatus that does not incorporate IrDA communication capability, the internal configuration of the terminal apparatus needs to be modified to constitute an infrared communication device as described above. To achieve this, an extra software program needs to be added that achieves IrDA communication. Such a software program has a considerably large scale, and therefore, in cases where an already-existing terminal apparatus is modified to constitute an infrared communication device, its CPU 101 needs to be run faster to execute the software program, and larger storage capacities are required in its ROM 102 and RAM 103. Thus, it is inevitable to increase the performance of the CPU of the already-existing terminal apparatus and also increase the capacities of the ROM and RAM thereof.

Quite inconveniently, this infrared communication device, having a faster-operating CPU 101 and larger-capacity ROM 102 and RAM 103, consumes an accordingly larger amount of electric power.

SUMMARY OF THE INVENTION

An object of the present invention is to provide an IrDA communication IC that has a communication function complying with the IrDA standards and that, in a case where an IrDA communication function is added to an already-existing terminal apparatus, enables the terminal apparatus to perform IrDA communication by being connected to the terminal apparatus with almost no modification in the internal configuration of the terminal apparatus.

To achieve this object, according to the present invention, an IrDA communication IC is provided with: an input/output interface for converting data fed in from outside the IrDA communication IC into parallel data to be processed within the IrDA communication IC, and for converting parallel data output from within the IrDA communication IC into data to be fed out to outside the IrDA communication IC; a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface; a modulation circuit for modulating the IrDA-protocol-conforming signal fed from the protocol control circuit; and a demodulation circuit for demodulating the signal fed in from outside and then feeding this demodulated signal to the protocol control circuit.

In this IrDA communication IC, the input/output interface may be a serial input/output interface that converts serial data fed in from outside the IrDA communication IC into parallel data and that converts parallel data output from within the IrDA communication IC into serial data.

The above IrDA communication IC may be further provided with a first FIFO circuit connected between the protocol control circuit and the modulation circuit and a second FIFO circuit connected between the protocol control circuit and the demodulation circuit. The first FIFO circuit accumulates IrDA-protocol-conforming data fed from the protocol control circuit, and then feeds this accumulated data to the modulation circuit sequentially on a first-in-first-out basis. The second FIFO circuit accumulates demodulated IrDA-protocol-conforming data fed from the demodulation circuit, and then feeds this accumulated data to the protocol control circuit sequentially on a first-in-first-out basis.

The first FIFO circuit may, when the amount of the data accumulated therein becomes smaller than a predetermined amount, send an interrupt request to the protocol control circuit to notify the protocol control circuit that further data can be accumulated as that data. This helps limit the amount and thereby prevent an overflow of the data accumulated in the first FIFO circuit. On the other hand, the second FIFO circuit may, when the amount of the data accumulated therein becomes larger than a predetermined amount, send an interrupt request to the protocol control circuit to instruct the protocol control circuit to start processing that data on a first-in-first-out basis. This helps limit the amount and thereby prevent an overflow of the data accumulated in the second FIFO circuit.

Another object of the present invention is to provide an electronic apparatus to which an IrDA-complying communication function is added by incorporating a control device having an IrDA-complying communication function into an already-existing electronic apparatus without significant modifications in the hardware software thereof.

To achieve this object, according to the present invention, an electronic apparatus is provided with: an overall controller for controlling the system operation of the electronic apparatus proper; a connector to which a cable is connected to allow communication with an external electronic apparatus and thereby allow exchange of data; a level conversion driver connected between the overall controller and the connector so as to convert the voltage level of the data; an IrDA communication IC connected to the data transfer path between the level conversion driver and the overall controller so as to perform modulation and demodulation and perform conversion of IrDA-protocol-conforming data to allow IrDA-complying communication; and an IrDA transceiver connected to the IrDA communication IC so as to exchange infrared signals with an external electronic apparatus having an IrDA-complying communication function.

In this electronic apparatus, the IrDA communication IC may be provided with: an input/output interface for converting data fed in from outside the IrDA communication IC into parallel data to be processed within the IrDA communication IC, and for converting parallel data output from within the IrDA communication IC into data to be fed out to outside the IrDA communication IC; a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface; a modulation circuit for modulating the IrDA-protocol-conforming signal fed from the protocol control circuit; and a demodulation circuit for demodulating the signal fed in from outside and then feeding this demodulated signal to the protocol control circuit. Here, the protocol control circuit also controls the operation of the modulation circuit and the demodulation circuit.

Still another object of the present invention is to provide an externally-fitted communication apparatus that allows an IrDA-complying communication function to be added to an already-existing electronic apparatus by being connected thereto.

To achieve this object, according to the present invention, an externally-fitted communication apparatus that is externally fitted to an electronic apparatus to add an IrDA-complying communication function thereto is provided with: an IrDA communication IC for performing modulation and demodulation and performing conversion of IrDA-protocol-conforming data to allow IrDA-complying communication; an IrDA transceiver connected to the IrDA communication IC so as to exchange infrared signals with an external electronic apparatus having an IrDA-complying communication function; and an IrDA communication connector connected to the IrDA communication IC so as to allow exchange of data with the electronic apparatus.

In this externally-fitted communication apparatus, the IrDA communication IC may be provided with: an input/output interface for converting data fed in from outside the IrDA communication IC into parallel data to be processed within the IrDA communication IC, and for converting parallel data output from within the IrDA communication IC into data to be fed out to outside the IrDA communication IC; a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface; a modulation circuit for modulating the IrDA-protocol-conforming signal fed from the protocol control circuit; and a demodulation circuit for demodulating the signal fed in from outside and then feeding this demodulated signal to the protocol control circuit. Here, the protocol control circuit also controls the operation of the modulation circuit and the demodulation circuit.

By the use of an externally-fitted communication apparatus as described above, addition of an IrDA-complying communication function to an electronic apparatus that has a controller for controlling the electronic apparatus proper, a first connector for allowing exchange of data with an external electronic apparatus, and a level conversion driver connected between the controller and the first connector so as to convert the voltage level of the data and that performs communication with the external electronic apparatus by way of a cable is achieved by providing a second connector connected to the data transfer path between the controller and the first connector and then connecting the IrDA communication connector of the externally-fitted communication apparatus to the second connector.

BRIEF DESCRIPTION OF THE DRAWINGS

This and other objects and features of the present invention will become clear from the following description, taken in conjunction with the preferred embodiments with reference to the accompanying drawings in which:

FIGS. 2A and 2B are block diagrams showing the relationship between the IrDA communication IC shown in FIG. 1 and a peripheral apparatus connected thereto;

FIGS. 4A and 4B are block diagrams showing the relationship between the IrDA communication IC shown in FIG. 3 and a peripheral apparatus connected thereto;

DESCRIPTION OF THE PREFERRED EMBODIMENTS

<First Example of an IrDA Communication IC>

Figure 1:
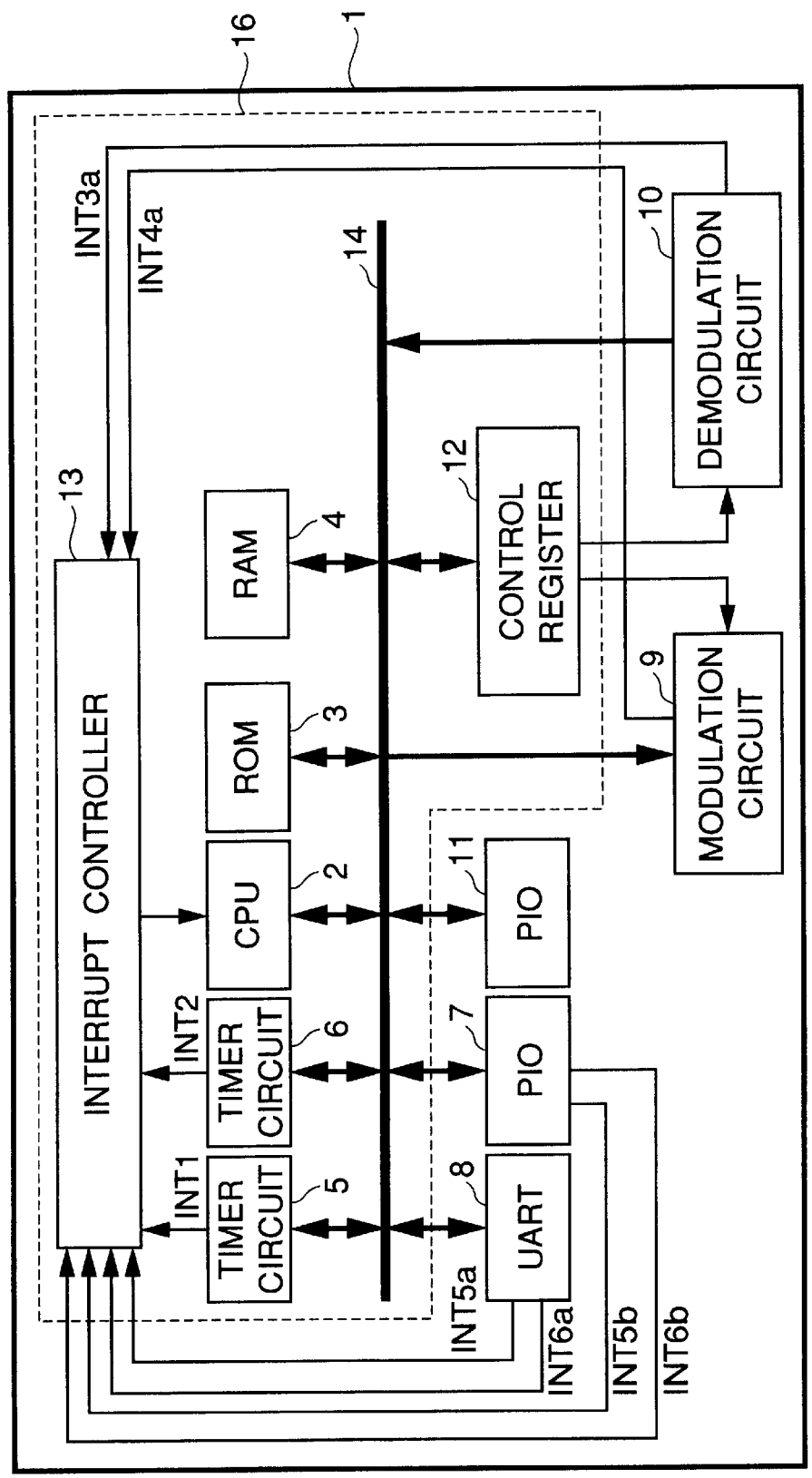
FIG. 1 is a block diagram showing an example of the internal configuration of an IrDA communication IC according to the invention.

An example of the configuration of an IrDA communication IC according to the present invention will be described below with reference to the drawings. FIG. 1 is a block diagram showing the internal configuration of an IrDA communication IC having an IrDA-complying communication function according to the invention. FIGS. 2A and 2B are block diagrams showing the relationship between the main CPU that controls the terminal apparatus connected to the IrDA communication IC and the IrDA communication IC itself.

The IrDA communication IC 1 shown in FIG. 1 has a CPU 2 for controlling the entire IrDA communication IC 1, a ROM 3 for storing a software program for achieving IrDA-complying communication, a RAM 4 for storing data and temporarily saving instruction codes during IrDA-complying communication, a timer circuit 5 for inhibiting reception operation for a predetermined period of time after transmission operation, a timer circuit 6 for checking whether there is a signal coming from an external electronic apparatus or not by periodically activating a predetermined portion of the IrDA communication IC 1 to exchange commands, a PIO (parallel input/output controller) 7 for achieving connection to an interface, as provided in a printer or the like, complying with the Centronics standards, a UART (universal asynchronous receiver-transmitter) 8 for achieving connection to an interface, as provided in a portable terminal apparatus or the like, complying with the RS-232C standards or the like, a modulation circuit 9 for modulating data, a demodulation circuit 10 for demodulating a received signal, a PIO 11 for receiving data for setting up the IrDA communication IC 1 and for outputting the current settings of the IrDA communication IC 1, a control register 12 for feeding the modulation circuit 9 and the demodulation circuit 10 with instructions related to the communication rate, the transmission pulse width, and the like, an interrupt controller 13 for sending an interrupt request to the CPU 2, and a bus 14 for achieving exchange of data among the constituent blocks 2 to 12.

When an IrDA communication IC 1 having a configuration as described above is connected to an already-existing terminal apparatus such as a personal computer or portable telephone equipped with an interface complying with the RS-232 standards or the like, as shown in FIG. 2A, the main CPU 15a provided within the terminal apparatus exchanges data through the UART 8 of the IC 1 with the CPU 2, ROM 3, RAM 4, timer circuits 5 and 6, control register 12, and interrupt controller 13, which together constitute a protocol controller 16.

When the same IrDA communication IC 1 is connected to an already-existing terminal apparatus such as a printer equipped with an interface complying with the Centronics standards such as IEEE 1284, as shown in FIG. 2B, the main CPU 15b provided within the terminal apparatus exchanges data through the PIO 7 of the IrDA communication IC 1 with the protocol controller 16 mentioned above.

The protocol controller 16 processes data to convert it into data conforming to the protocol required by the IrDA standards. This IrDA-protocol-conforming data is then modulated by the modulation circuit 9, and is then transmitted as an infrared signal from an IrDA transceiver 17. Conversely, an infrared signal received by the IrDA transceiver 17 is demodulated by the demodulation circuit 10 so as to be converted into IrDA-protocol-conforming data, which is then fed to and processed by the protocol controller 16.

In this IrDA communication IC 1 having the configuration described above, when the IrDA transceiver 17 connected to the IrDA communication IC 1 receives an infrared signal, the modulation circuit 10 sends a signal INT3a to the interrupt controller 13. As a result, the interrupt controller 13 sends an interrupt request to the CPU 2 to instruct the CPU 2 to perform control operation to perform IrDA-complying reception operation according to the software program stored in the ROM 3.

In this case, data is converted into data conforming to the standards according to which the data is exchanged between the IrDA communication IC 1 and the above-mentioned terminal apparatus connected thereto, and this converted data is then fed through the UART 8 or PIO 7 to the main CPU 15a or 15b, respectively. When the amount of data that is held within the UART 8 or PIO 7 for output to the main CPU 15a or 15b becomes smaller than a predetermined amount, the UART 8 or PIO 7 sends a signal INT6a or INT6b to the interrupt controller 13. As a result, the interrupt controller 13 sends an interrupt request to the CPU 2 to instruct the CPU 2 to perform control operation in such a way that the UART 8 or PIO 7 outputs the data converted by the protocol controller 16.

On the other hand, when the UART 8 or PIO 7 receives data from the main CPU 15a or 15b, respectively, of the above-mentioned terminal apparatus connected to the IrDA communication IC 1, the UART 8 or PIO 7 sends a signal INT5a or INT5b to the interrupt controller 13. As a result, the interrupt controller 13 sends an interrupt request to the CPU 2 to instruct the CPU 2 to perform control operation to perform IrDA-complying transmission operation according to the software program stored in the ROM 3. In this case, the data received by the UART 8 or PIO 7 is converted into IrDA-protocol-conforming data, and is then fed to the modulation circuit 9. The data modulated by the modulation circuit 9 is then transmitted as an infrared signal from the IrDA transceiver 17.

The transmission and reception operation described above is not constantly being performed. Specifically, the timer circuit 6 operates in such a way that, when the IrDA communication IC 1 is kept on for a predetermined period of time without the PIO 7 or UART 8 receiving any data and without the demodulation circuit 10 receiving any signal, the part of the IrDA communication IC 1 other than the circuits for operating the timer circuit 6 and the circuits related to reception such as the demodulation circuit 10 is turned off. In this way, the state of the connection with the communication partner is checked by repeating transmission and reception operation substantially periodically, and this is achieved by making the timer circuit 6 send a signal INT2 to the interrupt controller 13 so as to send an interrupt request to the CPU 2.

Moreover, after transmission operation is performed by the use of a light-emitting device (not shown) provided inside the IrDA transceiver 17, a period of time (called a turnaround time) needs to be secured in which reception operation is inhibited, because reception operation is performed by the use of a light-sensing device (not shown) that is disposed close to the light-emitting device. To achieve this, the timer circuit 5 operates in such a way as to inhibit reception operation in this period of time. In this way, reception operation is inhibited in a predetermined period of time (turnaround time), and this is achieved by making the timer circuit 5 send a signal INT1 to the interrupt controller 13 so as to send an interrupt request to the CPU 2.

<Second Example of an IrDA Communication IC>

Figure 3:
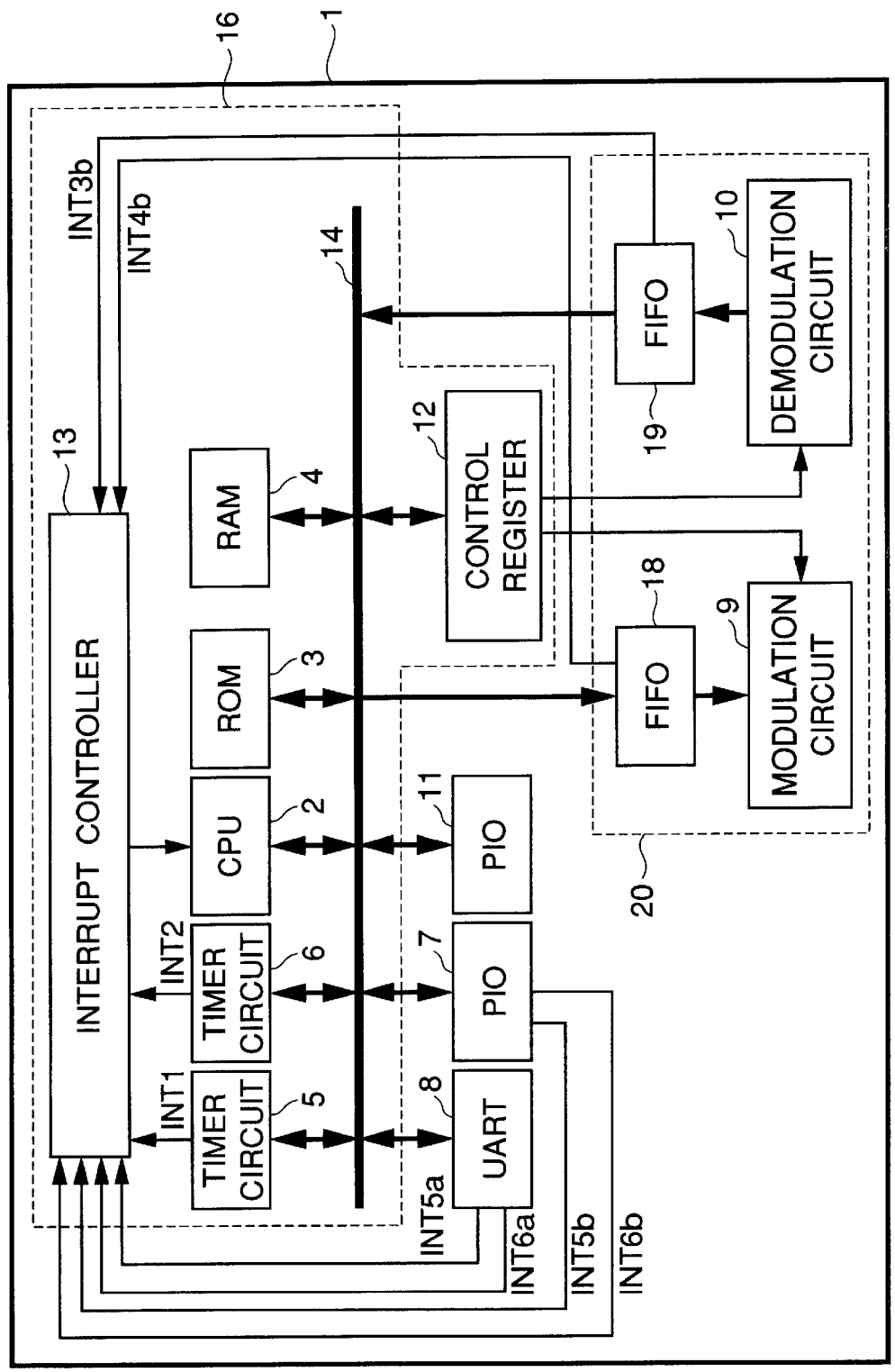
FIG. 3 is a block diagram showing another example of the internal configuration of an IrDA communication IC according to the invention.

Another example of the configuration of an IrDA communication IC according to the present invention will be described below with reference to the drawings. FIG. 3 is a block diagram showing the internal configuration of another IrDA communication IC having an IrDA-complying communication function according to the invention. FIGS. 4A and 4B are block diagrams showing the relationship between the main CPU that controls the terminal apparatus connected to the IrDA communication IC and the IrDA communication IC itself. It is to be noted that, in FIGS. 3, 4A, and 4B, such components as are found also in FIGS. 1, 2A, and 2B are identified with the same reference numerals and symbols and their detailed descriptions will not be repeated in the following descriptions.

The IrDA communication IC 1 shown in FIG. 3 is provided with a FIFO circuit 18 connected to the modulation circuit 9 so as to accumulate data to be transmitted (consisting of 31 bytes in this example) fed thereto by way of the bus 14, and a FIFO circuit 19 connected to the demodulation circuit 10 so as to accumulate demodulated data (consisting of 31 bytes in this example) output from the demodulation circuit 10. Thus, the bus 14 exchanges data with the modulation circuit 9 and the demodulation circuit 10 not directly but through the FIFO circuits 18 and 19. The modulation circuit 9, demodulation circuit 10, and FIFO circuits 18 and 19 together constitute a modulation/demodulation circuit 20.

In this IrDA communication IC 1, as shown in FIGS. 4A or 4B, when the UART 8 or PIO 7 receives data from the main CPU 15a or 15b, respectively, of the terminal apparatus connected to the IrDA communication IC 1, the data is fed from the UART 8 or PIO 7 to the protocol controller 16 so as to be converted into IrDA-protocol-conforming data, as in the first example described previously. The converted data is then fed to the modulation/demodulation circuit 20. The data thus fed from the protocol controller 16 to the modulation/demodulation circuit 20 is then fed through the FIFO circuit 18 to the modulation circuit 9 so as to be modulated. The modulated data is then fed to the IrDA transceiver 17 so as to be transmitted therefrom as an infrared signal.

Meanwhile, the FIFO circuit 18, when the amount of data accumulated therein becomes equal to one byte or less, sends a signal INT4b to the interrupt controller 13. As a result, the interrupt controller 13 sends an interrupt request to the CPU 2 to instruct the CPU 2 to perform control operation according to the software program stored in the ROM 3 in such a way that the protocol controller 16 processes data to be output to the PIO 7 or UART 8 and then feeds the data to the FIFO 18.

On the other hand, when the IrDA transceiver 17 receives an infrared signal, a corresponding signal is fed therefrom to the demodulation circuit 10 so as to be demodulated. The resulting data thus demodulated and converted into IrDA-protocol-conforming data is then fed to the FIFO circuit 19. The FIFO circuit 19, when the amount of data accumulated therein becomes equal to eight bytes or more, sends a signal INT3b to the interrupt controller 13. As a result, the interrupt controller 13 sends an interrupt request to the CPU. 2 to instruct the CPU 2 to perform control operation in such a way that the data within the FIFO circuit 19 is fed to the protocol controller 16 and then the protocol controller 16 performs processing similar to that performed during reception operation in the first example described previously.

Here, the use of the FIFO circuits 18 and 19 helps save the CPU 2 from controlling the entire protocol controller 16 and the modulation/demodulation circuit 20 simultaneously at all times and thereby makes it possible to perform desired control operation without greatly increasing the performance of the CPU 2.

An IrDA communication IC according to the present invention may be further provided with a terminal for receiving an external clock that keeps the IrDA communication IC operating. In that case, when the electronic apparatus incorporating the IrDA communication IC does not require infrared communication, the main CPU can stop supplying the clock to the IrDA communication, IC. By stopping all operation of the IrDA communication IC in this way so as to save power, it is possible to realize a power-saving function that helps achieve a further reduction in power consumption.

An IrDA communication IC according to the present invention may be further provided with a power-saving terminal for receiving from the main CPU an instruction to stop the clock that keeps the IrDA communication IC operating. In that case, when the electronic apparatus incorporating the IrDA communication IC does not require infrared communication, the main CPU can send an instruction to stop the generation of the clock that keeps the IrDA communication IC operating. By stopping all operation of the IrDA communication IC in this way so as to save power, it is possible to realize a power-saving function that helps achieve a further reduction in power consumption.

Hereinafter, as embodiments of the present invention, an electronic apparatus having an IrDA communication IC as described above and some externally-fitted communication apparatuses for adding an IrDA-complying communication function to an already-existing electronic apparatus will be described with reference to the drawings.

<First Embodiment>

Figure 5:
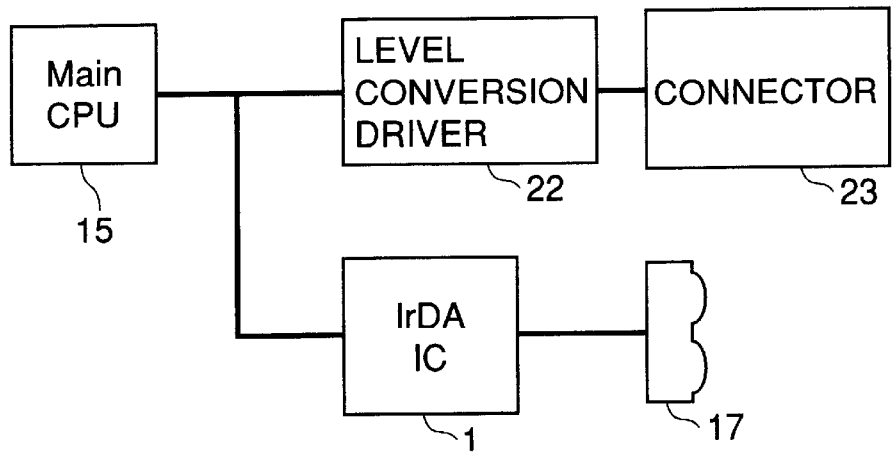
FIG. 5 is a block diagram showing, as a first embodiment of the invention, the configuration of an electronic apparatus having an IrDA-complying communication function incorporated therein.

A first embodiment of the invention will be described below with reference to a drawing. FIG. 5 is a block diagram showing the internal configuration of an already-existing electronic apparatus, with an IrDA-complying communication function added thereto.

As shown in FIG. 5, the electronic apparatus of this embodiment having an IrDA-complying communication function added thereto has a main CPU 15 provided in the already-existing electronic apparatus, a level conversion driver for converting the voltage level of data output from the main CPU 15 into the voltage level required to allow the data to be transferred across a cable used to exchange data with an external electronic apparatus and for converting the voltage level of data fed in via a connector 23 into the voltage level required to allow the data to be processed by the main CPU 15, a connector 23 to which a cable or the like is connected to: allow exchange of data and that complies with the RS-232, Centronics, or other standards, an IrDA communication IC 1 for processing IrDA-protocol-conforming data, and an IrDA transceiver 17 for exchanging infrared signals. The IrDA communication IC 1 has a configuration as shown in FIG. 1 or 3 described previously.

In this embodiment, in the already-existing electronic apparatus that from the beginning includes the main CPU 15, level conversion driver 22, and connector 23, the data transfer path connecting between the main CPU 15 and the level conversion driver 22 is bifurcated so as to be connected also to the IrDA communication IC 1, which in turn is connected to the IrDA transceiver 17. In this way, an IrDA-complying communication function is added to the already-existing electronic apparatus.

Here, in cases where the data processed by the main CPU 15 complies with the RS-232C standards or the like, the bifurcated path between the main CPU 15 and the level conversion driver 22 is connected to the UART 8 (FIG. 1 or 3) provided within the IrDA communication IC 1. On the other hand, in cases where the same data complies with the Centronics standards, the bifurcated path between the main CPU 15 and the level conversion driver 22 is connected to the PIO 7 (FIG. 1 or 3) provided within the IrDA communication IC 1.

<Second Embodiment>

Figure 6:
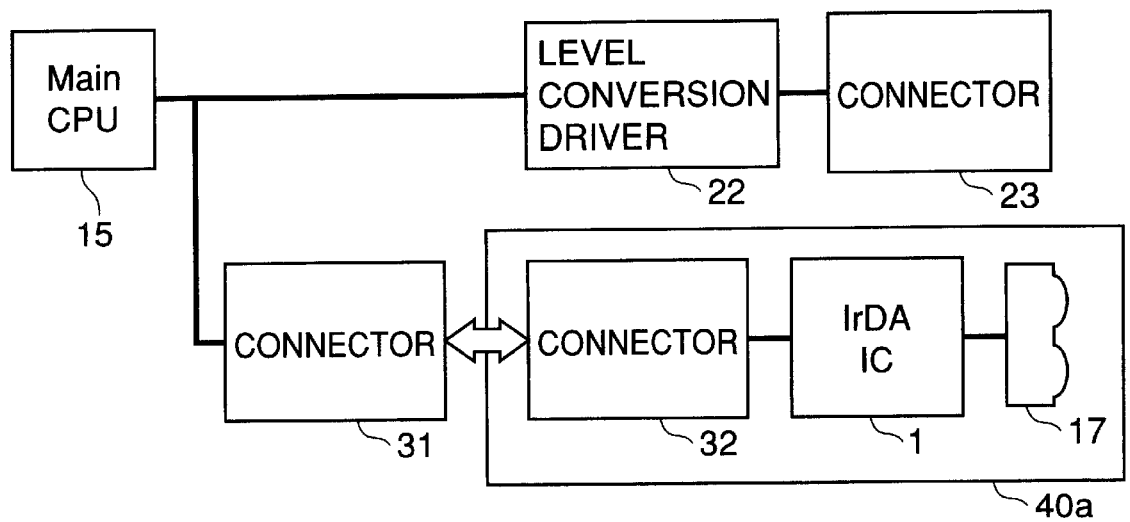
FIG. 6 is a block diagram showing, as a second embodiment of the invention, the configuration of an electronic apparatus having an externally-fitted communication apparatus connected thereto.

A second embodiment of the invention will be described below with reference to a drawing. FIG. 6 is a block diagram showing, as a second embodiment of the invention, the internal configuration of an already-existing electronic apparatus having an externally-fitted communication apparatus connected thereto. It is to be noted that such components as are used in the second embodiment for the same purposes as in the first embodiment are identified with the same reference numerals and symbols and their detailed descriptions will not be repeated.

In this embodiment, the data transfer path provided within the already-existing electronic apparatus so as to connect between the main CPU 15 and the level conversion driver 22 is bifurcated so as to be connected also to a connector 31 that is additionally provided to allow connection to an external electronic apparatus. To this connector 31, the externally-fitted communication apparatus 40a is connected, which has a connector 32 for allowing connection to the connector 31, an IrDA communication IC 1 for achieving IrDA-complying communication, and an IrDA transceiver 17 for exchanging infrared signals.

When the connector 32 provided within this externally-fitted communication apparatus 40a is connected to the connector 31 provided within the already-existing electronic apparatus, the main CPU 15 and the IrDA communication IC 1 exchange raw data via the connectors 31 and 32. In other respects, the second embodiment operates in the same manner as the first embodiment, and therefore no detailed description will be given as to how the second embodiment operates. In this embodiment, when the main CPU 15 outputs raw data complying with the RS-232C standards, the connector 32 is connected to the UART 8 (FIG. 1 or 3) provided within the IrDA communication IC 1; when the main CPU 15 outputs raw data complying with the Centronics standards, the connector 32 is connected to the PIO 7 (FIG. 1 or 3) provided within the IrDA communication IC 1.

<Third Embodiment>

Figure 7:
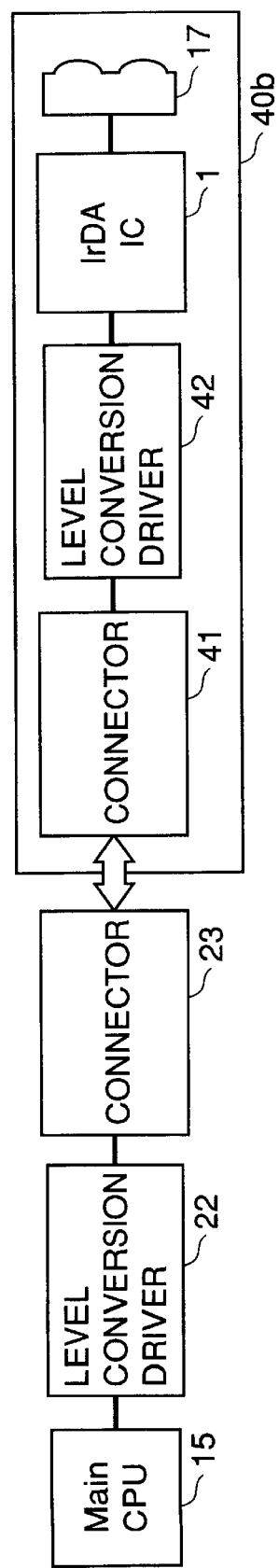
FIG. 7 is a block diagram showing, as a third embodiment of the invention, the configuration of an electronic apparatus having an externally-fitted communication apparatus connected thereto.

A third embodiment of the invention will be described below with reference to a drawing. FIG. 7 is a block diagram showing, as a third embodiment of the invention, the internal configuration of an already-existing electronic apparatus having an externally-fitted communication apparatus connected thereto. It is to be noted that such components as are used in the third embodiment for the same purposes as in the second embodiment are identified with the same reference numerals and symbols and their detailed descriptions will not be repeated.

In this embodiment, the externally-fitted communication apparatus allows an IrDA-complying communication function to be added to the already-existing electronic apparatus without any modification thereto. The externally-fitted communication apparatus 40b of this embodiment has a connector 41 that complies with the same standards, such as the RS-232C or Centronics standards, as the connector 23 of the already-existing electronic apparatus does, a level conversion driver 42 for converting the voltage level of raw data fed in via the connector 41 into the level required to allow the raw data to be processed by the IrDA communication IC 1 and for converting the voltage level of raw data output from the IrDA communication IC 1 into the level required to allow the raw data to be transferred between the connectors 23 and 41, an IrDA communication IC 1 for achieving IrDA-complying communication, and an IrDA transceiver 17 for exchanging infrared signals.

When the connector 41 provided within this externally-fitted communication apparatus 40b is connected to the connector 23 provided within the already-existing electronic apparatus, the main CPU 15 and the IrDA communication IC 1 exchange raw data via the connectors 23 and 41 and through the level conversion driver 22 and 42. In other respects, the third embodiment operates in the same manner as the first embodiment, and therefore no detailed description will be given as to how the third embodiment operates. In this embodiment when the main CPU 15 outputs data complying with the RS-232C standards or the like, the level conversion driver 42 is connected to the UART 8 (FIG. 1 or 3) provided within the IrDA communication IC 1; when the main CPU 15 outputs data complying with the Centronics standards or the like, the level conversion driver 42 is connected to the PIO 7 (FIG. 1 or 3) provided within the IrDA communication IC 1.

In cases where there is no need to use a cable or the like complying with the RS-232C, Centronics, or other standards to connect the externally-fitted communication apparatus 40b to the electronic apparatus, the level conversion drivers 22 and 42 may be omitted from the electronic apparatus and the externally-fitted communication apparatus 40b.

<Fourth Embodiment>

Figure 8:
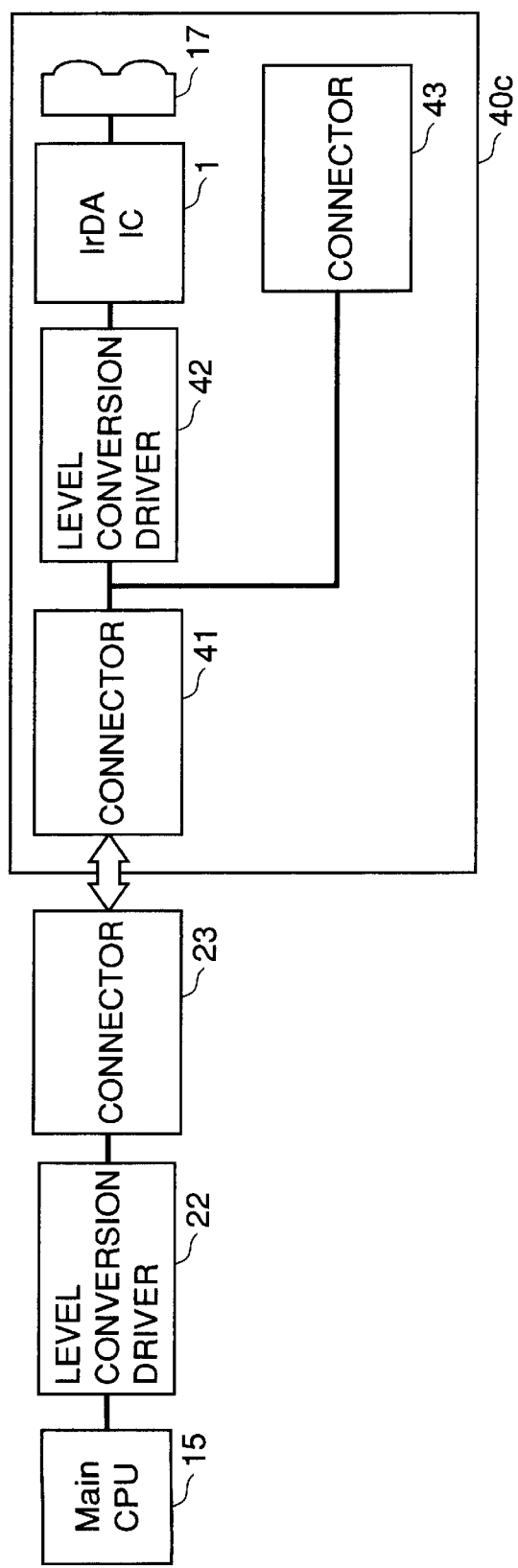
FIG. 8 is a block diagram showing, as a fourth embodiment of the invention, the configuration of an electronic apparatus having an externally-fitted communication apparatus connected thereto.
Figure 9:
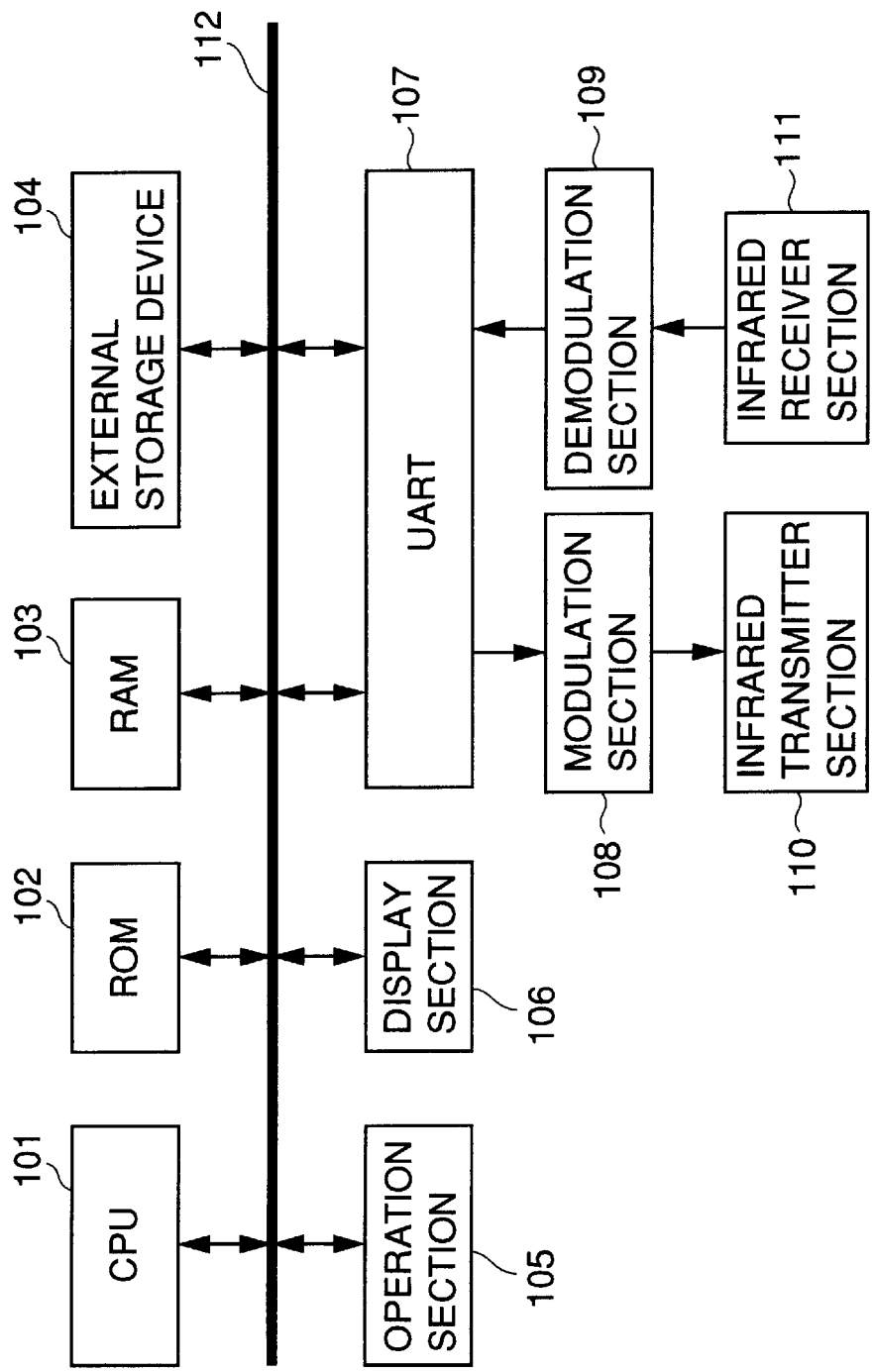
FIG. 9 is a block diagram showing the internal configuration of a conventional IC device having an infrared communication function.

A fourth embodiment of the invention will be described below with reference to a drawing. FIG. 8 is a block diagram showing, as a fourth embodiment of the invention, the internal configuration of an already-existing electronic apparatus having an externally-fitted communication apparatus connected thereto. It is to be noted that such components as are used in the fourth embodiment for the same purposes as in the third embodiment are identified with the same reference numerals and symbols and their detailed descriptions will not be repeated.

In the externally-fitted communication apparatus 40c of this embodiment, as compared with the externally-fitted communication apparatus 40b of the third embodiment, the data transfer path connecting between the connector 41 and the level conversion driver 42 is bifurcated so as to be connected also to an additionally provided connector 43. This externally-fitted communication apparatus 40c, when connected to the connector 23, serves not only to add an IrDA-complying communication function to the already-existing electronic apparatus, but also as a connector that allows another external apparatus to be connected to the already-existing electronic apparatus by way of a cable.

Here, the connector 43 is a connector that complies with the same standards as the connector 41 does. The fourth embodiment operates in the same manner as the third embodiment to achieve IrDA-complying communication, and therefore no detailed description will be given as to how the fourth embodiment operates.

An IrDA communication IC according to the present invention permits easy addition of an IrDA-complying communication function to an already-existing electronic apparatus without significant modifications in the CPU, ROM, and RAM provided in the electronic apparatus and in the software stored in the ROM. Moreover, during IrDA-complying communication, the CPU of the electronic apparatus is saved from operating for IrDA-complying communication, and this helps reduce the load to be handled by the CPU of the electronic apparatus and simultaneously reduce electric power consumed during IrDA-complying communication.

By providing a first and a second FIFO circuit for temporary saving of data, it is possible to allow the CPU of the protocol controller to perform control operation within its performance limitations during transmission and reception operation and thereby prevent overwork of the CPU. Moreover, the first and second FIFO circuits each limit the amount of data that is accumulated therein for output at a later time, and therefore the first and second FIFO circuits do not suffer from an overflow of the data accumulated therein.

Moreover, an IrDA communication IC according to the present invention can be designed to stop the operation of the part of the IrDA communication IC other than the circuits related to a first timer circuit. This helps reduce the electric power consumed when IrDA-complying communication is not performed. Furthermore, by providing a second timer circuit that inhibits reception operation for a predetermined period of time after transmission operation, it is possible to prevent malfunctioning due to reception operation being performed in a turnaround time.

An electronic apparatus according to the present invention allows an IrDA-complying communication function to be added thereto simply by incorporating an IrDA communication IC having an IrDA-complying communication function, and thus allows an IrDA-complying communication function to be added thereto without modifications in the hardware and software of the electronic apparatus proper. Moreover, by providing an already-existing electronic apparatus that does not have an IrDA-complying communication function with an additional connector that allows connection to the IrDA communication connector of an externally-fitted communication apparatus according to the present invention, and connecting the externally-fitted communication apparatus to this additional connector, it is possible to add an IrDA-complying communication function to the electronic apparatus without significant modifications in the hardware and software thereof. This electronic apparatus, simply provided with an additional connector, does not consume any extra electric power as does an electronic apparatus that requires significant modifications in the hardware and software thereof to allow an IrDA-complying communication function to be added thereto.

An externally-fitted communication apparatus according to the present invention has a level conversion driver incorporated therein, and thus, simply by connecting the externally-fitted communication apparatus, using the IrDA communication connector provided therein, to the connector provided in an already-existing electronic apparatus, it is possible to add an IrDA-complying communication function to the already-existing electronic apparatus without modifications in the hardware and software thereof. Within this externally-fitted communication apparatus, the data transfer path connecting between the IrDA communication connector and the level conversion driver may be bifurcated so as to be connected to an additional connector separate from the IrDA communication connector. This eliminates the need to provide an additional connector on the part of the already-existing electronic apparatus to allow another electronic apparatus to be connected thereto that exchanges data therewith by being connected to the connector thereof even when the externally-fitted communication apparatus is already connected to the connector of the already-existing electronic apparatus.

What is claimed is:

1. An IrDA communication IC comprising:
   an input/output interface for converting data fed in from outside the IrDA communication IC into a parallel data to processed within the IrDA communication IC, and for converting parallel data output from within the IrDA communication IC into data to be fed out to outside the IrDA communication IC;
   a protocol control circuit for converting the parallel data fed from the input/output interface into an IrDA-protocol-conforming signal, and for converting an IrDA-protocol-confirming signal fed in from outside and demodulated into parallel data and then feeding this parallel data to the input/output interface;
   a modulation circuit for modulating the IrDA-protocol-conforming signal fed from the protocol control circuit;
   a demodulation circuit for demodulating the signal fed in from outside and then feeding this demodulated signal to the protocol control circuit;
   a first timer circuit for periodically starting and stopping part of operation of the IrDA communication IC to check whether there is a signal coming from a communication partner or not; and
   a second timer circuit for inhibiting reception operation for a predetermined period of time after completion of transmission,
   wherein the protocol control circuit also controls operation of the modulation circuit and the demodulation circuit.

2. An IrDA communication IC as claimed in claim 1, wherein the input/output interface is a serial input/output interface that converts serial data fed in from outside the IrDA communication IC into parallel data and that coverts parallel data output from within the IrDA communication IC into serial data.

3. An electronic apparatus comprising:
   an IrDA communication IC as claimed in claim 1;
   an overall controller for controlling the entire electronic apparatus including the IrDA communication IC; and
   an IrDA transceiver connected to the IrDA communication IC so as to exchange infrared signals with an external electronic apparatus having an IrDA-complying communication function.

4. An IrDA communication IC comprising:
   an input/output interface for converting data fed in from outside the IrDA communication IC into parallel data to be processed within the IrDA communication IC, and for converting parallel data output from within the IrDA communication IC into data to be fed out to outside the IrDA communication IC;
   a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface.
   a modulation circuit for modulating the IrDA-protocol-conforming signal fed from the protocol control circuit;
   a demodulation circuit for demodulating the signal fed in from outside and then feeding this demodulated signal to the protocol control circuit;
   a first FIFO circuit connected between the protocol control circuit and the modulation circuit so as to accumulate IrDA-protocol-conforming data fed from the protocol control circuit and then feed this accumulated data to the modulation circuit sequentially on a first-in-first-out basis; and
   a second FIFO circuit connected between the protocol control circuit and the demodulation circuit so as to accumulate demodulated IrDA-protocol-conforming data fed from the demodulation circuit and then feed this accumulated data to the protocol control circuit sequentially on a first-in-first-out basis, wherein the protocol control circuit also controls operation of the modulation circuit and the demodulation circuit.

5. An IrDA communication IC as claimed in claim 4, wherein the first FIFO circuit is a FIFO circuit that accumulates, as the data accumulated therein, the signal output from the protocol control circuit and that sends an interrupt request to the protocol control circuit, when an amount of this data becomes smaller than a predetermined amount, to notify the protocol control circuit that further data can be accumulated as this data, and wherein the second FIFO circuit is a FIFO circuit that accumulates, as the data accumulated therein, the demodulated signal and that sends an interrupt request to the protocol control circuit, when an amount of this data becomes larger than a predetermined amount, to instruct the protocol control circuit to start processing this data on a first-in-first-out basis.

6. An IrDA communication IC as claimed in claim 4, further comprising:

a first timer circuit for periodically starting and stopping part of operation of the IrDA communication IC to check whether there is a signal coming from a communication partner or not; and a second timer circuit for inhibiting reception operation for a predetermined period of time after completion of transmission.

7. An electronic apparatus comprising:

an IrDA communication IC as claimed in claim 4;

an overall controller for controlling the entire electronic apparatus including the IrDA communication IC; and an IrDA transceiver connected to the IrDA communication IC so as to exchange infrared signals with another electronic apparatus having an IrDA-complying communication function.

8. An electronic apparatus comprising:

an overall controller for controlling system operation of the electronic apparatus proper;

a connector to which a cable is connected to allow communication with an external electronic apparatus and thereby allow exchange of data;

a level conversion driver connected between the overall controller and the connector so as to convert a voltage level of the data;

an IrDA communication IC connected to a data transfer path between the level conversion driver and the overall controller so as to perform modulation and demodulation and perform conversion of IrDA-protocol-conforming data to allow IrDA-complying communication; and an IrDA transceiver connected to the IrDA communication IC so as to exchange infrared signals with an external electronic apparatus having an IrDA-complying communication function.

9. An electronic apparatus as claimed in claim 8, wherein the IrDA communication IC comprises:

an input/output interface for converting data fed in from outside the IrDA communication IC into parallel data to be processed within the IrDA communication IC, and for converting parallel data output from within the IrDA communication IC into data to be fed out to outside the IrDA communication IC;

a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface;

a modulation circuit for modulating the IrDA-protocol-conforming signal fed from the protocol control circuit; and a demodulation circuit for demodulating the signal fed in from outside and then feeding this demodulated signal to the protocol control circuit, wherein the protocol control circuit also controls operation of the modulation circuit and the demodulation circuit.

a second FIFO circuit connected between the protocol control circuit and the demodulation circuit so as to accumulate demodulated IrDA-protocol-conforming data fed from the demodulation circuit and then feed this accumulated data to the protocol control circuit sequentially on a first-in-first-out basis, wherein the protocol control circuit also controls operation of the modulation circuit and the demodulation circuit.

10. An externally-fitted communication apparatus comprising:

an IrDA communication IC for performing modulation and demodulation and performing conversion of IrDA-protocol-conforming data to allow IrDA-complying communication, the IrDA communication IC comprising:

an input/output interface for converting data fed in from outside the IrDA communication IC into parallel data to be processed within the IrDA communication IC, and for converting parallel data output from within the IrDA communication IC into data to be fed out to outside the IrDA communication IC;

a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface;

a modulation circuit for modulating the IrDA-protocol-conforming signal fed from the protocol control circuit;

a demodulation circuit for demodulating the signal fed in from outside and then feeding this demodulated signal to the protocol control circuit;

a first timer circuit for periodically starting and stopping part of operation of the IrDA communication IC to check whether there is a signal coming from a communication partner or not; and a second timer circuit for inhibiting reception operation for a predetermined period of time after completion of transmission;

an IrDA transceiver connected to the IrDA communication IC so as to exchange infrared signals with an external electronic apparatus having an IrDA-complying communication function; and an IrDA communication connector connected to the IrDA communication IC so as to allow exchange of data with an electronic apparatus, wherein an IrDA-complying communication function is added to the electronic apparatus by connecting thereto the IrDA communication connector.

11. A method of adding an IrDA-complying communication function, comprising:

a step of, in an electronic apparatus including an overall controller for controlling the entire electronic apparatus, a first connector for allowing exchange of data with an external electronic apparatus, and a level conversion driver connected between the overall controller and the first connector so as to convert a voltage level of the data, providing a second connector in a data transfer path between the overall controller and the level conversion driver; and a step of connecting the IrDA communication connector of an externally-fitted communication apparatus as claimed in claim 10 to the second connector.

12. An externally-fitted communication apparatus comprising:

an IrDA communication IC for performing modulation and demodulation and performing conversion of IrDA-protocol-conforming data to allow IrDA-complying communication;

an IrDA transceiver connected to the IrDA communication IC so as to exchange infrared signals with an external electronic apparatus having an IrDA-complying communication function;

an IrDA communication connector connected to the IrDA communication IC so as to allow exchange of data with the electronic apparatus; and a level conversion driver connected between the IrDA communication connector and the IrDA communication IC so as to convert a voltage level of data fed in from the electronic apparatus via the IrDA communication connector into a voltage level of data to be processed by the IrDA communication IC and convert a voltage level of data processed by the IrDA communication IC into a voltage level of data to be fed out to the electronic apparatus via the IrDA communication connector.

13. An externally-fitted communication apparatus as claimed in claim 12, wherein the a level conversion driver connected between the IrDA communication IC comprises:

an input/output interface for converting data fed in from outside the IrDA communication IC into parallel data to be processed within the IrDA communication IC, and for converting parallel data output from within the IrDA communication IC into data to be fed out to outside the IrDA communication IC;

a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface;

a modulation circuit for modulating the IrDA-protocol-conforming signal fed from the protocol circuit; and a demodulation circuit for demodulating the signal fed into from outside and then feeding this demodulated signal to the protocol control circuit, wherein the protocol control circuit also controls operation of the modulation circuit and the demodulation circuit.

14. An externally-fitted communication apparatus as claimed in claim 12, wherein, to a data transfer path between the IrDA communication connector and the level conversion driver, another connector is connected separately from the IrDA communication connector.

15. A method of adding an IrDA-complying communication function, comprising:

a step of, in an electronic apparatus including an overall controller for controlling the entire electronic apparatus and a connector for allowing exchange of data with an external electronic apparatus, connecting to the connector the IrDA communication connector of an externally-fitted communication apparatus as claimed in claim 12.

16. An externally-fitted communication apparatus as claimed in claim 14, wherein the IrDA communication IC comprises:

an input/output interface for converting data fed in from outside the IrDA communication IC into parallel data to be processed within the IrDA communication IC, and for converting parallel data output from within the IrDA communication IC into data to be fed out to outside the IrDA communication IC;

a protocol control circuit for converting the parallel data fed from the input/output interface into an IrDA-protocol-conforming signal, and for converting an IrDA-protocol-conforming signal fed in from outside and demodulated into parallel data and then feeding this parallel data to the input/output interface;

a modulation circuit for modulating the IrDA-protocol-conforming signal fed from the protocol control circuit; and a demodulation circuit for demodulating the signal fed in from outside and then feeding this demodulated signal to the protocol control circuit, wherein the protocol control circuit also controls operation of the modulation circuit and the demodulation circuit.

17. A method of adding an IrDA-complying communication function, comprising:

a step of, in an electronic apparatus including an overall controller for controlling the entire electronic apparatus and a connector for allowing exchange of data with an external electronic apparatus, connecting to the connector the IrDA communication connector of an externally-fitted communication apparatus as claimed in claim 14.

\* \* \* \* \*